US012339856B2

(12) United States Patent
Palumbo et al.

(10) Patent No.: US 12,339,856 B2
(45) Date of Patent: Jun. 24, 2025

(54) SYSTEMS AND METHODS FOR PREDICTING COMPLETE QUERIES

(71) Applicant: Spotify AB, Stockholm (SE)

(72) Inventors: Enrico Palumbo, Turin (IT); Rui André Augusto Ferreira, London (GB); Hugues Bouchard, Barcelona (ES); Humberto Jesús Corona Pampín, Amsterdam (NL)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/171,247

(22) Filed: Feb. 17, 2023

(65) Prior Publication Data

US 2024/0281445 A1 Aug. 22, 2024

(51) Int. Cl.
*G06F 16/00* (2019.01)
*G06F 16/2457* (2019.01)
*G06F 16/28* (2019.01)

(52) U.S. Cl.
CPC ...... *G06F 16/24573* (2019.01); *G06F 16/285* (2019.01)

(58) Field of Classification Search
CPC ................................ G06F 16/24573
USPC ........................................... 707/690
See application file for complete search history.

(56) References Cited

U.S. PATENT DOCUMENTS

| | | | | |
|---|---|---|---|---|
| 9,355,191 B1* | 5/2016 | Finkelstein | ....... | G06F 16/90324 707/707 |
| 2002/0172039 A1* | 11/2002 | Inditsky | ............... | G02B 6/0043 362/231 |
| 2015/0347503 A1 | 12/2015 | Kumaran et al. | | |
| 2016/0247110 A1* | 8/2016 | Sinha | ............... | G06Q 10/06316 707/707 |
| 2017/0351951 A1* | 12/2017 | Santos | .................. | G06F 16/285 707/707 |
| 2019/0278870 A1 | 9/2019 | Novielli et al. | | |
| 2020/0279556 A1 | 9/2020 | Gruber et al. | | |
| 2022/0172039 A1* | 6/2022 | Liu | .......................... | G06N 3/08 707/707 |

* cited by examiner

*Primary Examiner* — Alexandria Y Bromell
(74) *Attorney, Agent, or Firm* — Morgan, Lewis & Bockius LLP

(57) ABSTRACT

An electronic device generates training data to train a classifier to classify a respective search query as complete or incomplete, including: obtaining a first search query input by a first user; determining a media content item selected by the first user from the first search query; comparing metadata associated with the media content item with the first search query input by the first user; and labeling the first search query as complete or incomplete based on the comparison. The electronic device trains the classifier, using the generated training data, to classify a respective search query as complete or incomplete and uses the trained classifier to determine whether a second search query is complete or incomplete. The electronic device provides, for display, for a second user, one or more complete search queries as recommendations for a received search query, including the second search query if second search query is complete.

19 Claims, 8 Drawing Sheets

700

702 Generate training data to train a classifier to classify a respective search query as complete or incomplete, including:

704 Obtaining a first search query input by a first user.

706 Determining a media content item selected by the first user from the first search query.

708 Comparing metadata associated with the media content item with the first search query input by the first user.

710 The metadata associated with the media content item includes a plurality of categories, including one or more of a title, a topic, a publisher, a host, and a guest, wherein each category in the plurality of categories associated with one or more respective terms.

712 Labeling the first search query as complete or incomplete based on the comparison.

714 In accordance with a determination that the first search query meets matching criteria with respect to the metadata associated with the media content item, labeling the first search query as a complete search query; and in accordance with a determination that the first search query does not meet the matching criteria with respect to the metadata associated with the media content item, labeling the first search query as an incomplete search query.

716 Train the classifier, using the generated training data, to classify a respective search query as complete or incomplete.

718 Store determined complete search queries in a lookup table.

720 Receive a received search query from the second user.

722 Use the trained classifier to determine whether a second search query is complete or incomplete.

↓

724 Using the trained classifier to determine whether the received search query is complete in real-time.

↓

726 Provide, for display, for a second user, one or more complete search queries as recommendations for the received search query, including the second search query in accordance with a determination that the second search query is complete.

728 The providing display of the one or more complete search queries as recommendations for the received search query is performed in accordance with a determination that the received search query is an incomplete search query.

730 The one or more complete search queries that are provided for display as recommendations for the received search query are selected in accordance with a determination that the one or more complete search queries satisfy one or more taste profile parameters associated with the second user.

732 The providing for display the one or more complete search queries as recommendations for the received search query is performed without providing, for display, one or more incomplete search queries as recommendations for the received search query.

FIG. 7B

SYSTEMS AND METHODS FOR PREDICTING COMPLETE QUERIES

TECHNICAL FIELD

The disclosed embodiments relate generally to media provider systems, and, in particular, to training and using a classifier to predict whether a query term is a complete or incomplete query.

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. To cope with the constantly growing complexity of navigating the large number of goods, users are enabled to input search criteria, via text and voice commands, to search for and access media items. Media content providers are able to provide personalized recommendations for content based on the input search criteria.

SUMMARY

Media content may be associated with metadata that is not recognized by, for example, dictionaries, such as song titles, artist names, or other metadata. When a user inputs a search query that includes search criteria related to metadata, it can be difficult for a media provider to recognize whether the search query is a complete search query (e.g., intended to correspond to metadata for a media content item) or is an incomplete search query. This is particularly true in the context of "instant search," in which updated search results are updated as the user provides the query (e.g., after each character is entered by the user). In order to provide search query suggestions based on previous users' searches, a media content provider needs to determine whether the previous users' queries are complete or incomplete, for example, so that a complete query is presented as a suggestion and incomplete queries are not.

In the disclosed embodiments, systems and methods are provided for predicting, using a classifier, whether a query term corresponds to a complete or incomplete (e.g., partial) query. As noted above, in the context of "instant search," it is difficult to know whether the final query input by the user is a complete or incomplete query, as the user may have selected a search result after providing a partial (incomplete) query. This, in turn, makes it difficult to use other users' previous queries (e.g., stored in a query log) to recommend complete queries that are related to the user's search query. To train the classifier, the system generates training data by comparing search queries provided by users to metadata associated with the respective content items selected by the respective users from the search queries. In some embodiments, the respective search query is labeled as a complete query if the query matches, completely and correctly, a string (e.g., or field) of the metadata associated with the content item that the user clicked after inputting the search query, and the search query is considered an incomplete query if the query matches a portion, less than all, of a string (e.g., a word) of the metadata associated with the content item. The training (using said training data) configures the classifier to predict, using a classifier, whether a query term corresponds to a complete or incomplete (e.g., partial) query. The trained classifier may then be used to, e.g., build a database of complete queries to be used as recommended queries for other users, as well as for other purposes described herein.

To that end, in accordance with some embodiments, a method is provided. The method includes generating training data to train a classifier to classify a respective search query as complete or incomplete, including: obtaining a first search query input by a first user; determining a media content item selected by the first user from the first search query; comparing metadata associated with the media content item with the first search query input by the first user; and labeling the first search query as complete or incomplete based on the comparison. The method further includes training the classifier, using the generated training data, to classify a respective search query as complete or incomplete. The method includes using the trained classifier to determine whether a second search query is complete or incomplete. The method further includes providing, for display, for a second user, one or more complete search queries as recommendations for a received search query, including the second search query in accordance with a determination that the second search query is complete.

In accordance with some embodiments, an electronic device is provided. The electronic device includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein.

Thus, systems are provided with improved methods for predicting whether a query term is complete or incomplete.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 7A-7B are flow diagrams illustrating a method of predicting whether a query term is complete or incomplete, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
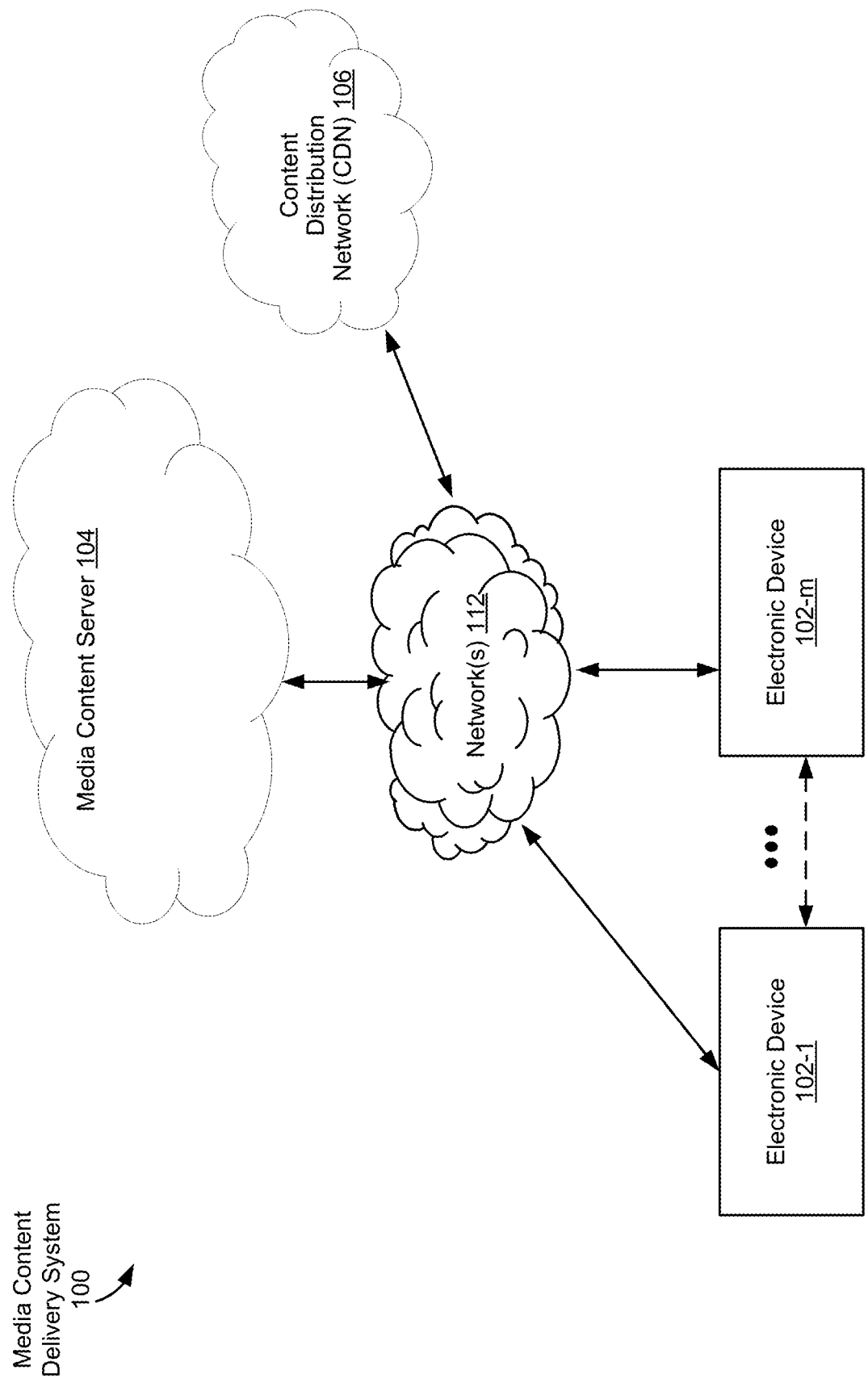
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, podcasts, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
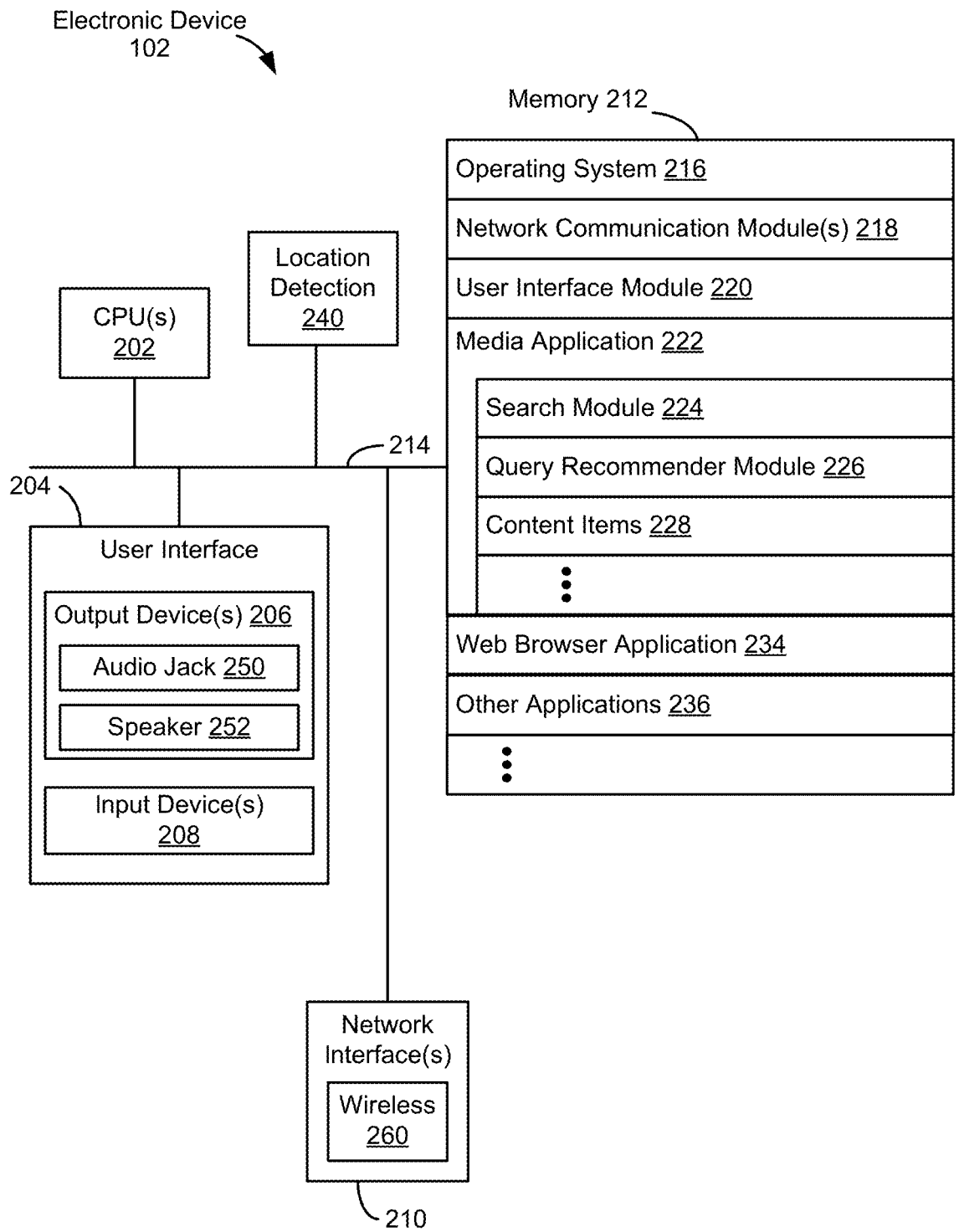
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the client device 102 to other computing devices (e.g., media presentation system(s), media content server 104, and/or other client devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

a search module 224 for receiving a user-input search query and/or for retrieving media items that match the search query (e.g., locally, or from a server of the media-content provider);

a query recommender module 226 for identifying and/or displaying recommended queries (e.g., including queries corresponding to media items, topics, or other search terms) to include in a search user interface;

a content items module 228 for storing media items, including audio items such as podcasts and songs, for playback and/or for forwarding requests for media content items to the media content server;

a web browser application 234 for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
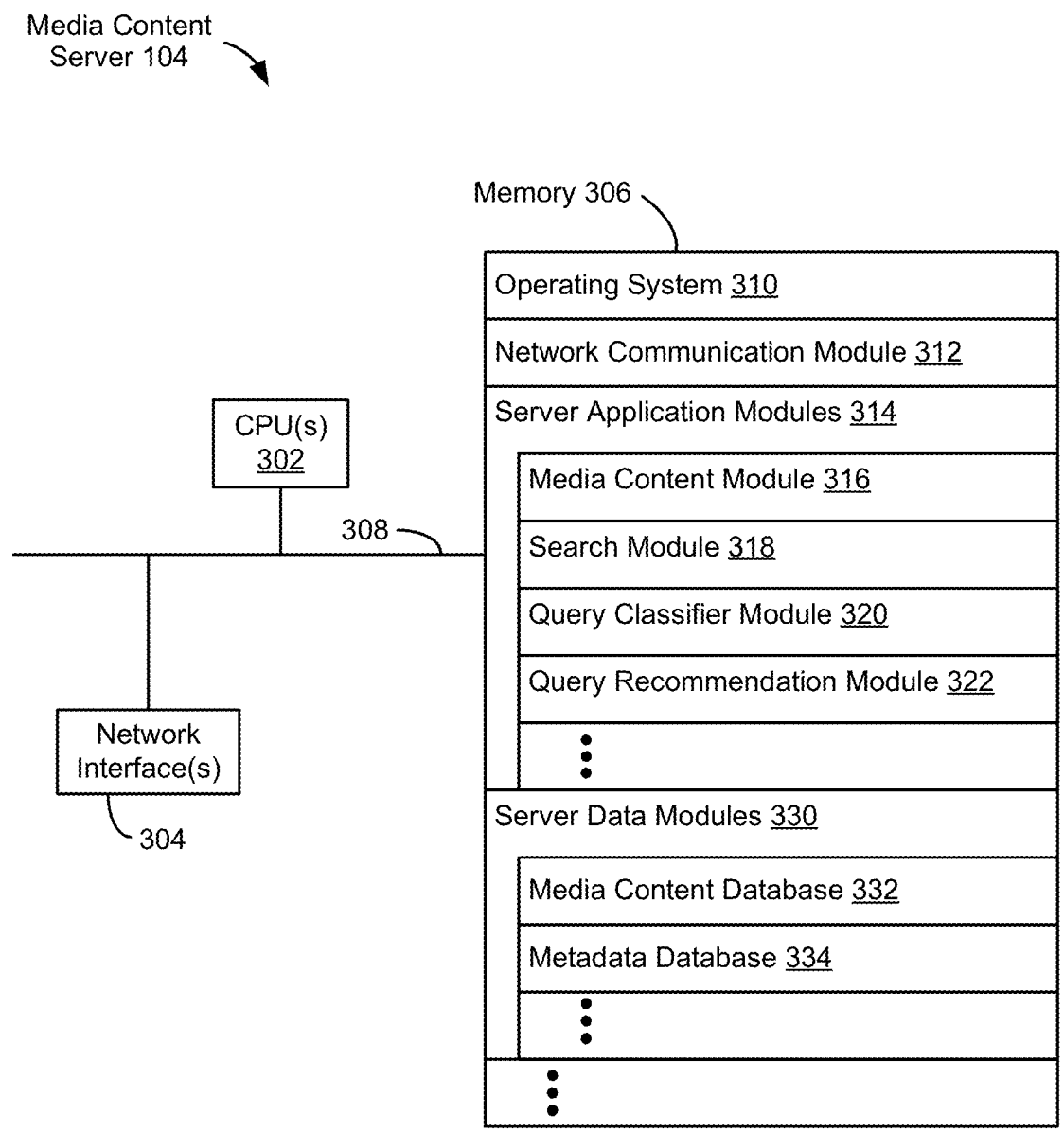
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a media content module 316 for storing one or more media content items and/or sending (e.g., streaming), to the electronic device, one or more requested media content item(s);

a search module 318 for receiving, in real-time, from electronic device 102, a user-input search query and/or for retrieving media items that match the search query;

a query classifier module 320 for training (e.g., including generating training data to train the classifier) and/or using a classifier to classify a query, requested by the electronic device, as complete or incomplete;

a query recommendation module 322 for identifying one or more queries that are related to a search query, input at electronic device 102, and for providing, for display, the identified queries as recommendations for the user of the electronic device 102.

one or more server data module(s) 330 for handling the storage of and/or access to media items and/or metadata relating to the media items; in some embodiments, the one or more server data module(s) 330 include:

a media content database 332 for storing media items; and a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
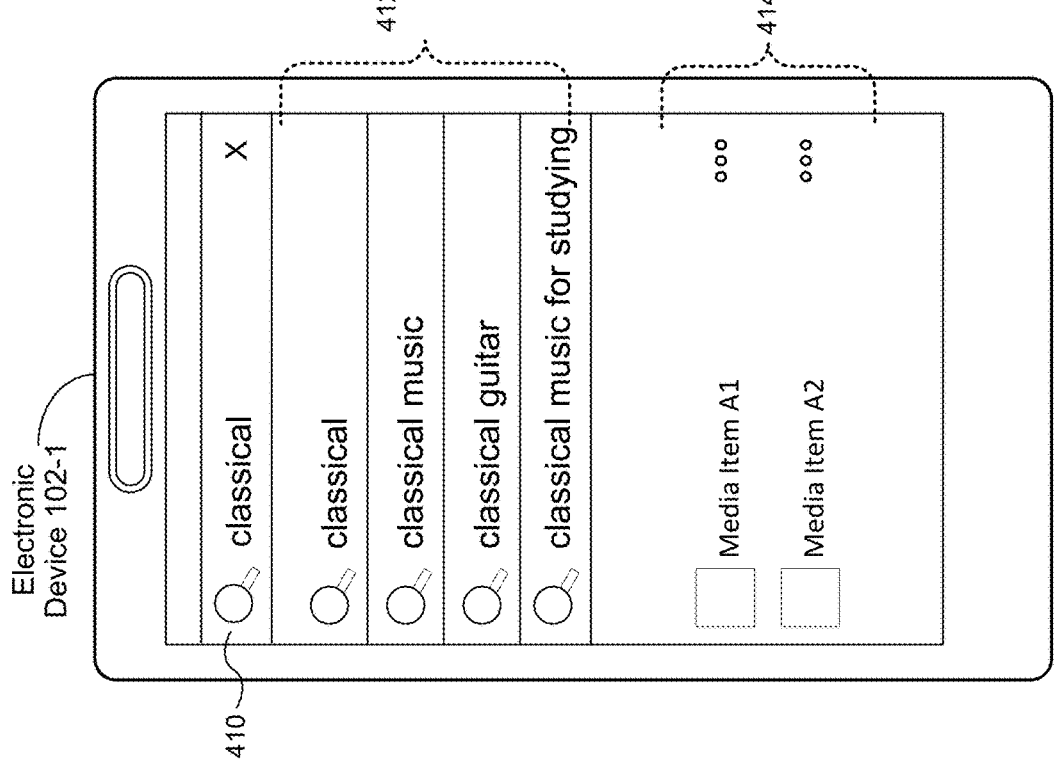
FIG. 4A-4B are block diagrams illustrating user interfaces for displaying recommendations in a search user interface, in accordance with some embodiments.
Figure 4B:
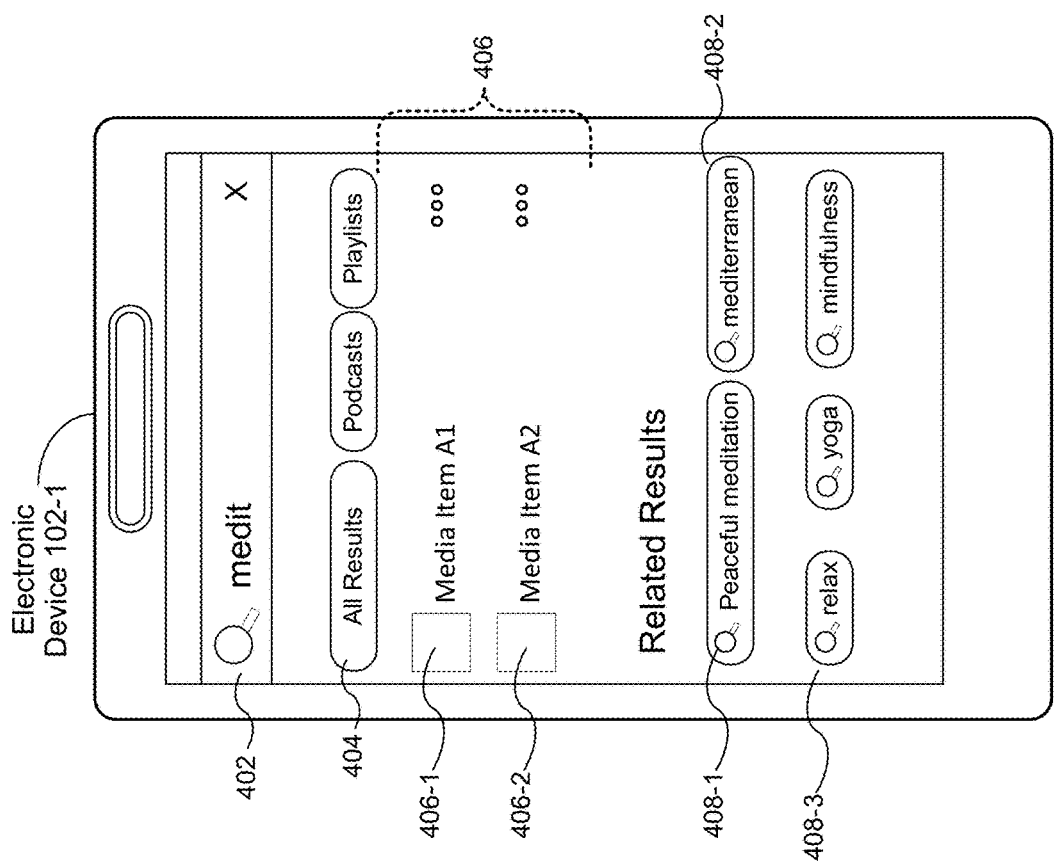

FIGS. 4A-4B are example user interfaces for displaying a search user interface on an electronic device 102-1. FIG. 4A illustrates representations of media items in a set of media items 406 that are included as recommended search results for search query 402. For example, the set of media items 406 includes media items 406-1 and 406-2 (e.g., and, optionally, the search results include additional media items not currently displayed on the user interface of electronic device 102-1 such that the user is enabled to scroll or otherwise browse the additional media items).

In some embodiments, media items 406-1 and 406-2 are selected for display in accordance with satisfying (e.g., matching) search criteria indicated by search query 402. In some embodiments, media items 406-1 and 406-2 are selected based at least in part on a taste profile of the user of electronic device 102-1 (e.g., such that the device provides recommendations to the user based on the user's preferences for media content), as indicated by a playback history of the user.

FIG. 4A illustrates a search user interface that includes a search query 402 that is input by the user (e.g., via voice command and/or typed), "medit." In some embodiments, the search user interface includes one or more options to filter the search results, for example to either display "all results" 404, or to display a filtered version of the search results, such as results that are "podcasts" or "playlists." In some embodiments, the search results include one or more media items that are identified as matching the search query and/or the search results include recommended search queries. For example, the system provides a plurality of recommended search queries 408-1, 408-2 and 408-3 ("Related Results") based on the search query 402 (e.g., and based on whether the search query 402 is complete or incomplete).

In some embodiments, using the systems described with reference to FIGS. 5A-5B and 6, in response to search query 402, the system determines whether the search query 402 is a complete query or an incomplete query (e.g., using a machine learning model). For example, in some embodiments, recommended search queries are displayed in accordance with a determination that search query 402 is an incomplete search query. In some embodiments, the recommended search queries include queries that are determined as complete queries (e.g., the recommended search queries do not include queries that are classified as incomplete queries). For example, the system recommends complete search queries (e.g., as determined by the machine learning model described below) to the user in the search user interface in response to search query 402. In some embodiments, the complete search queries that are provided as recommended search queries correspond to complete queries input by one or more other users of the media-providing service (e.g., from another user's search history).

In some embodiments, recommended search queries do not include terms that correspond to titles of particular media items. For example, each recommended search query indicates metadata and/or other search terms (e.g., distinct from the search query 402) that are used to replace search query 402 (e.g., instead of providing a recommended media item). For example, the user is enabled to select one or more of the recommended search queries, and in response to the user selection, the system identifies one or more media items that satisfy the selected recommended search query (e.g., the selected recommended search query becomes the updated search query, and the search results are updated accordingly).

As illustrated in FIG. 4A, in some embodiments, each recommended search query (e.g., search query suggestion) is optionally displayed as a selectable user-interface element that enables the user to select a recommended search query to use as the search term(s). For example, in response to a user selection of button 408-1 for "peaceful meditation," the device updates search query 402 from "medit" to "peaceful meditation." In some embodiments, the recommended search queries 408-1 through 408-3 are complete search queries, as determined by the machine learning model and/or determined by performing a lookup in a table of stored complete search queries. In some embodiments, as described with reference to FIGS. 5A-5B, the machine learning model is trained to assign a respective search query as a complete search query in accordance with a determination that the text of the respective search query represents one or more words (e.g., that correspond to metadata of one or more media items) in their entirety. For example, "medit" is an incomplete query, whereas "mediterranean" and "relax" are complete queries.

FIG. 4B illustrates an example of the search user interface that includes a received search query 410 input by the user. In some embodiments, received search query 410 is a complete query (e.g., as determined using the model described with reference to FIG. 6). For example, the search query 410 "classical" is determined as being a complete search query according to the machine learning model described in FIG. 6. In some embodiments, in accordance with a determination that search query 410 is a complete search query, the recommended set of search suggestions 412 includes search results that include the text of search query 410. In some embodiments, different sets of results are provided depending on whether search query 410 is a complete or an incomplete query. For example, a first set of the recommended search suggestions 412 (e.g., optionally that are provided in accordance with a determination that the search query 410 is a complete search query) includes search queries (e.g., that do not directly correspond to titles of media content items) that include the word "classical," such as "classical music," "classical guitar." In some embodiments, a second set of recommended search suggestions are provided (e.g., optionally in accordance with a determination that the search query is an incomplete search query) that includes one or more recommended completions of the search query. It will be understood that in some embodiments, the system displays one of or both of the first set and the second set of recommended search suggestions in a same user interface. In some embodiments, in addition to providing complete queries in the search suggestions 412, the system also optionally provides titles of media items (e.g., "classical music for studying" corresponds to a playlist title for a playlist). In some embodiments, the search results also include one or more media items 414 that satisfy search criteria indicated by search query 410.

Figure 5B:
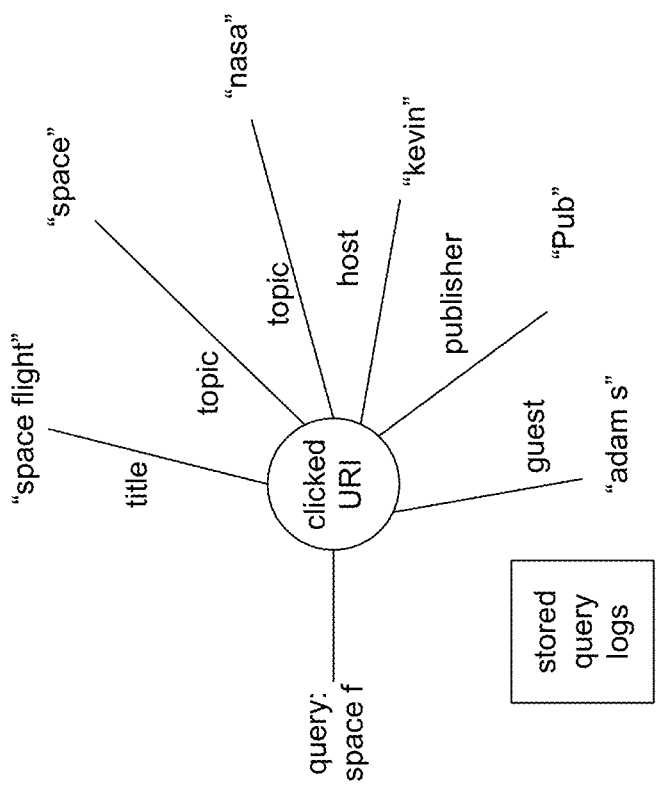
FIGS. 5A-5B are block diagrams illustrating a map between a query and metadata of a selected item, in accordance with some embodiments.
Figure 5A:
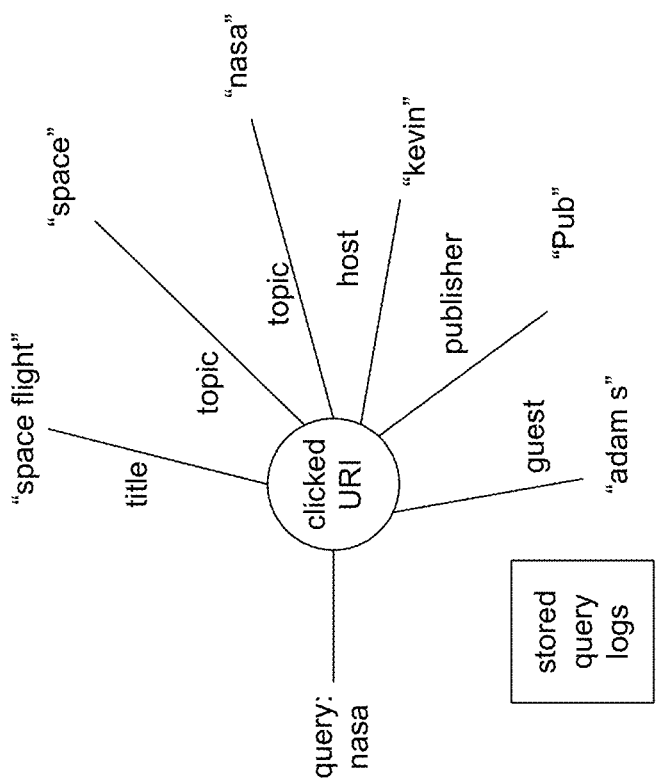

FIGS. 5A-5B are block diagrams illustrating mapping a query to metadata to generate training data for the classifier, in accordance with some embodiments. For example, to generate training data for the classifier, a query input by a user (e.g., retrieved from stored query logs) is selected, and an identifier of the media item that the user selected (e.g., "clicked URI") is identified for the query. Metadata for the identified media item is retrieved. For example, media items are associated with metadata including one or more of title, topic(s), host(s), publisher(s), and guest(s). It will be understood that additional and/or alternative metadata is available for different media items. The system then labels the query is complete or incomplete based on whether the letters in the query match (e.g., completely) a term in the metadata.

In the example illustrated in FIG. 5A, a user (e.g., of electronic device 102) has typed "nasa" and then clicked on an item (e.g., "clicked URI"). The system retrieves metadata associated with the clicked item (e.g., the item the user that typed the query selected). For example, the stored query logs include a query input by a respective user, and an identifier (URI) of the media content item that the respective user selected during the search session.

In FIG. 5A, for example, the clicked item is associated with metadata, including a title ("space flight"), one or more topics (e.g., "space" and "nasa"), a host ("kevin"), a publisher ("Pub") and a guest ("adam s"). In some embodiments, to generate the training data, the system determines whether the query input by the user ("nasa") matches any of the metadata of the media item associated with the clicked URI. In FIG. 5A, the query "nasa" matches associated topic metadata field "nasa." Thus, the query "nasa" is labeled a complete query.

In the example illustrated in FIG. 5B, the user has typed "space f" and then clicked on an item with associated topic metadata field "space flight." The query "space f" is then labeled as an incomplete query because the query, as input by the user, did not match (e.g., completely match) a term in the metadata associated with the selected (e.g., clicked) media item. Although "space f" partially matches the metadata "space flight" of the media item associated with the clicked URI, because the string "f" does not fully (e.g., 100%) match "flight," the query is labeled as incomplete.

In some embodiments, the system performs the evaluation described with reference to FIGS. 5A-5B for thousands of queries and clicked URIs to generate training data for training a classifier (e.g., or other machine learning model). For example, the system accesses query logs from a plurality of search sessions of one or more users to generate training data.

As described in more detail with reference to FIG. 6, the system then uses the trained classifier to determine whether respective queries are complete or incomplete queries, and provides recommendations during a user's search session by only providing complete query terms in the recommendations. For example, as illustrated in FIG. 4A, only complete queries are provided as recommendations ("Related Results") including, "relax," without providing a recommendation for a partial (e.g., incomplete) query such as, "rel".

Figure 6:
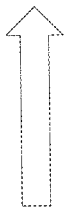
FIG. 6 is a block diagram illustrating a classifier that predicts a probability of a query being a complete or incomplete query, in accordance with some embodiments.
Figure 6:
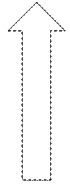

FIG. 6 illustrates an example of predicting, using the trained model (e.g., classifier or other machine-learning model), a probability that a respective query is complete. In some embodiments, the model computes a completeness value for a respective query representing a likelihood that the query is complete. In some embodiments, the model assigns the prediction as either complete or incomplete based on the completeness value (e.g., wherein the model calculates the completeness value). For example, a query that satisfies a threshold completeness value (e.g., 0.7) is labeled as complete, and a query that does not satisfy the threshold completeness value is labeled as incomplete.

FIG. 6 further illustrates that, although the model is trained to label respective queries as complete or incomplete, in some embodiments, an incomplete query (e.g., "je pense q") is incorrectly labeled as a complete query. Thus, in some embodiments, a different threshold completeness value (e.g., higher or lower than 0.7) is used to determine whether to label a respective query as complete or incomplete. Further, in some embodiments, the model is retrained with additional queries to improve the performance of the model.

In some embodiments, the system stores queries that are determined as complete queries in a table, such that, when providing recommended search queries (e.g., in response to detecting a user search query), the system is enabled to perform a lookup using the table and queries that have previously been labeled as complete queries are candidates for the system to provide as recommended search queries.

It will be understood by one of ordinary skill in the art that the model illustrated in FIG. 6 is, in some embodiments, retrained and/or updated over time using additional training data. Further, in some embodiments, training data in different languages are used to train the model such that it is robust across a plurality of languages. In some embodiments, the model is enabled to provide results in real-time, such that, in response to a user query, the model determines whether the user query is complete or incomplete, and, if the query is incomplete, the system provides recommendations for complete queries that are related to the incomplete query. In some embodiments, if the user query is determined as complete, the system optionally does not provide recommendations for complete queries and instead provides (e.g., displays) search results that match the complete user query.

FIGS. 7A-7B are flow diagrams illustrating a method 700 of identifying complete queries, in accordance with some embodiments. Method 700 may be performed at an electronic device (e.g., media content server 104 and/or electronic device(s) 102) having one or more processors and memory storing instructions for execution by the one or more processors. In some embodiments, the method 700 is performed by executing instructions stored in the memory (e.g., memory 212, FIG. 2, memory 306, FIG. 3) of the electronic device. In some embodiments, the method 700 is performed by a combination of the server system (e.g., including media content server 104 and CDN 106) and a client device.

Referring now to FIG. 7A, in performing the method 500, the electronic device generates (702) training data to train a classifier to classify a respective search query as complete or incomplete.

Generating the training data includes obtaining (704) a first search query input by a first user, and determining (706) a media content item selected by the first user from the first search query. For example, as described with reference to FIG. 5A, the first search query is "nasa" and the clicked URI corresponds to the media content item that was selected by the user after the user input the first search query (e.g., in the search session).

Generating the training data includes comparing (708) metadata (e.g., using matching criteria) associated with the media content item with the first search query input by the first user. For example, in FIG. 5A, the first search query "nasa" is compared to metadata such as the title, topic(s), host(s), publisher(s), and/or guest(s) that is stored in association with the media item corresponding to the clicked URI.

In some embodiments, the metadata associated with the media content item includes (710) a plurality of categories, including one or more of a title, a topic, a publisher, a host, and a guest, wherein each category in the plurality of categories associated with one or more respective terms.

Generating the training data includes labeling (712) the first search query as complete or incomplete based on the comparison. For example, in FIG. 5A, "nasa" is labeled as complete because it matches the string "nasa" that is stored as metadata (e.g., a topic) of the clicked URI. In FIG. 5B, the search query "space f" is labeled as incomplete because it does not match a string stored in the metadata for the clicked URI. In some embodiments, the query must fully match at least one text string in the metadata to be considered a complete query (e.g., anything less than a full match, such as one character difference is considered an incomplete query). In some embodiments, the electronic device assigns the search query as complete in accordance with a determination that there is a match.

In some embodiments, steps 704-712 are repeated (e.g., for multiple queries and clicked URIs) to generate the training data. For example, steps 704-712 are repeated, for example, 100, 1000, or 10,000 for additional search queries input by the user (e.g., that are stored in the stored query logs). In some embodiments, the additional search queries are input by the same user. In some embodiments, the additional search queries are input by a plurality of users.

In some embodiments, generating the training data includes (714): in accordance with a determination that the first search query meets matching criteria with respect to the metadata associated with the media content item, labeling the first search query as a complete search query; and in accordance with a determination that the first search query does not meet the matching criteria with respect to the metadata associated with the media content item, labeling the first search query as an incomplete search query, as described with reference to FIGS. 5A-5B.

The electronic device trains (716) the classifier, using the generated training data, to classify a respective search query as complete or incomplete. For example, the trained classifier is illustrated in FIG. 6 as classifying a plurality of search queries.

In some embodiments, the electronic device stores (718) determined complete search queries in a lookup table. For example, after determining that a search query is complete, using the classifier, the complete search queries are stored for future reference, such that the system is enabled to perform lookups of the stored complete search queries (e.g., to be used as candidates of recommendations of complete search queries).

In some embodiments, the electronic device receives (720) a received search query from the second user (e.g., in a search interface). For example, as illustrated in FIG. 4A-4B, a second user of electronic device 102-1 inputs a search query. In some embodiments, the second user is the same as the first user (e.g., a same user that input the first query for generating the training data also inputs the second query). In some embodiments, the second user is distinct from the first user.

The electronic device uses (722) the trained classifier to determine whether a second search query is complete or incomplete. In some embodiments, the second search query is also received from a user (e.g., a third user, distinct from the second user and the first user). In some embodiments, the electronic device determines whether the second search query is complete or incomplete is performed after or in response to receiving the second search query.

In some embodiments, the method includes using the trained classifier to determine whether the received search query is complete (724) in real-time. In some embodiments, as illustrated in FIGS. 4A-4B, the one or more complete search queries that are provided for display as recommendations for the received search query are provided and updated, in real-time, as the user updates the received search query.

The electronic device provides (726), for display, for the second user (e.g., the same user as the first user or a different user), one or more complete search queries as recommendations for the received search query (e.g., without displaying an incomplete search query as a recommendation). In some embodiments, the recommendations include the second search query in accordance with a determination that the second search query is complete. In some embodiments, the recommendations are further selected based on other features (e.g., popularity and/or the user's taste profile). In some embodiments, the one or more recommendations are provided for display without regard to or in response to receiving a received query (e.g., the recommendations are provided in response to the user loading a particular user interface).

In some embodiments, the providing display of the one or more complete search queries as recommendations for the received search query is performed (728) in accordance with (e.g., in response to) a determination that the received search query is an incomplete search query. For example, using the trained classifier to determine whether a received search query is complete includes determining that the received search query is not complete (e.g., is an incomplete search query). In some embodiments, if the received search query is a complete search query, the system optionally does not display the one or more complete search queries (e.g., and performs a search function of the received search query that is a complete search query). In other words, in some embodiments, the system provides recommended complete search queries in response to an incomplete query input by the user. In some embodiments, the system provides recommended complete search queries whether the received search query is complete or incomplete.

In some embodiments, the one or more complete search queries that are provided for display as recommendations for the received search query are selected (730) in accordance with a determination that the one or more complete search queries satisfy one or more taste profile parameters (or other features) associated with the second user. In some embodiments, the recommendations are further selected based on other features, such as popularity of the one or more complete search queries. For example, the second user is associated with a taste profile that indicates preferences of the second user. In some embodiments, the taste profile is determined using a playback history of the second user and/or information the user has shared with the media-providing service in the user's profile.

In some embodiments, in addition to providing the one or more complete search queries, the electronic device provides, for display, one or more recommended media items that are related to the received search query.

In some embodiments, the providing for display the one or more complete search queries as recommendations for the received search query is performed (732) without providing, for display, one or more incomplete search queries as recommendations for the received search query.

In some embodiments, the electronic device receives an indication of a user input, from the second user, selecting a query from the one or more complete search queries, and in response to the indication of the user input, executes a search function using the selected query as the search query (e.g., as described with reference to FIG. 4A).

Although FIGS. 7A-7B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method of identifying complete queries, including:
at an electronic device:
generating training data to train a classifier to classify a respective search query as complete or incomplete, including:
obtaining a first search query input by a first user;
determining a media content item selected by the first user from the first search query;
comparing metadata associated with the media content item with the first search query input by the first user; and
labeling the first search query as complete or incomplete based on the comparison, wherein the first search query is labeled as a complete query in accordance with a determination that the first search query matches a string of metadata associated with the media content item;
training the classifier, using the generated training data, to classify a respective search query as complete or incomplete;
using the trained classifier to determine whether a second search query is complete or incomplete; and
providing, for display, for a second user, one or more complete search queries as recommendations for a received search query, including the second search query in accordance with a determination that the second search query is complete.

2. The method of claim 1, wherein the first search query is labeled as an incomplete query in accordance with a determination that the first search query does not match metadata associated with the media content item.

3. The method of claim 1, wherein the providing display of the one or more complete search queries as recommendations for the received search query is performed in accordance with a determination that the received search query is an incomplete search query.

4. The method of claim 1, including receiving the received search query from the second user.

5. The method of claim 1, wherein the one or more complete search queries that are provided for display as recommendations for the received search query are selected in accordance with a determination that the one or more complete search queries satisfy one or more taste profile parameters associated with the second user.

6. The method of claim 1, including, storing determined complete search queries in a lookup table.

7. The method of claim 1, further comprising using the trained classifier to determine whether the received search query is complete in real-time.

8. The method of claim 1, wherein the providing for display the one or more complete search queries as recommendations for the received search query is performed without providing, for display, one or more incomplete search queries as recommendations for the received search query.

9. The method of claim 1, wherein the metadata associated with the media content item includes a plurality of categories, including one or more of a title, a topic, a publisher, a host, and a guest, wherein each category in the plurality of categories is associated with one or more respective terms.

10. An electronic device, comprising:
one or more processors; and
memory storing one or more programs, the one or more programs including instructions for:
generating training data to train a classifier to classify a respective search query as complete or incomplete, including:
obtaining a first search query input by a first user;
determining a media content item selected by the first user from the first search query;
comparing metadata associated with the media content item with the first search query input by the first user; and
labeling the first search query as complete or incomplete based on the comparison, the first search query is labeled as a complete query in accordance with a determination that the first search query matches a string of metadata associated with the media content item;
training the classifier, using the generated training data, to classify a respective search query as complete or incomplete;
using the trained classifier to determine whether a second search query is complete or incomplete; and
providing, for display, for a second user, one or more complete search queries as recommendations for a received search query, including the second search query in accordance with a determination that the second search query is complete.

11. A non-transitory computer-readable storage medium storing one or more programs for execution by an electronic device with one or more processors, the one or more programs comprising instructions for:
generating training data to train a classifier to classify a respective search query as complete or incomplete, including:
obtaining a first search query input by a first user;
determining a media content item selected by the first user from the first search query;
comparing metadata associated with the media content item with the first search query input by the first user; and labeling the first search query as complete or incomplete based on the comparison, the first search query is labeled as a complete query in accordance with a determination that the first search query matches a string of metadata associated with the media content item;

training the classifier, using the generated training data, to classify a respective search query as complete or incomplete;

using the trained classifier to determine whether a second search query is complete or incomplete; and providing, for display, for a second user, one or more complete search queries as recommendations for a received search query, including the second search query in accordance with a determination that the second search query is complete.

12. The electronic device of claim 10, wherein the first search query is labeled as an incomplete query in accordance with a determination that the first search query does not match metadata associated with the media content item.

13. The electronic device of claim 10, wherein the providing display of the one or more complete search queries as recommendations for the received search query is performed in accordance with a determination that the received search query is an incomplete search query.

14. The electronic device of claim 10, including receiving the received search query from the second user.

15. The electronic device of claim 10, wherein the one or more complete search queries that are provided for display as recommendations for the received search query are selected in accordance with a determination that the one or more complete search queries satisfy one or more taste profile parameters associated with the second user.

16. The electronic device of claim 10, wherein the one or more programs include instructions for storing determined complete search queries in a lookup table.

17. The electronic device of claim 10, wherein the one or more programs include instructions for using the trained classifier to determine whether the received search query is complete in real-time.

18. The electronic device of claim 10, wherein the providing for display the one or more complete search queries as recommendations for the received search query is performed without providing, for display, one or more incomplete search queries as recommendations for the received search query.

19. The electronic device of claim 10, wherein the metadata associated with the media content item includes a plurality of categories, including one or more of a title, a topic, a publisher, a host, and a guest, wherein each category in the plurality of categories is associated with one or more respective terms.

* * * * *